United States Patent [19]
Tsumura

[11] 4,150,410
[45] Apr. 17, 1979

[54] CASSETTE TAPE LOADING DEVICE

[75] Inventor: Nobuo Tsumura, Yokohama, Japan

[73] Assignee: Tokyo Shibaura Electric Co., Ltd., Kawasaki, Japan

[21] Appl. No.: 895,818

[22] Filed: Apr. 12, 1978

[30] Foreign Application Priority Data

| Apr. 15, 1977 | [JP] | Japan | 52-43176 |
| Apr. 15, 1977 | [JP] | Japan | 52-43177 |
| Apr. 30, 1977 | [JP] | Japan | 52-50494 |
| Apr. 30, 1977 | [JP] | Japan | 52-50495 |
| Apr. 30, 1977 | [JP] | Japan | 52-50496 |
| May 16, 1977 | [JP] | Japan | 52-56232 |

[51] Int. Cl.² .................. G11B 15/00; G11B 23/08
[52] U.S. Cl. ............................. 360/137; 360/96.5
[58] Field of Search .................. 360/137, 93–96; 242/55, 19 K

[56] References Cited

U.S. PATENT DOCUMENTS

| 3,394,898 | 7/1968 | Laa | 360/96 |
| 3,770,283 | 11/1973 | Jäger | 360/96 |
| 3,870,247 | 3/1975 | Carisey | 360/96 |
| 4,050,087 | 9/1977 | Kishi | 360/95 |
| 4,072,988 | 2/1978 | Sato | 360/137 |

FOREIGN PATENT DOCUMENTS 5229928  8/1977  Japan .......................... 360/96

Primary Examiner—Jay P. Lucas
Attorney, Agent, or Firm—Oblon, Fisher, Spivak, McClelland & Maier

[57] ABSTRACT

A cassette tape holder for use in a tape recorder is rotated between an inoperative position on the outside of a cabinet at which a cassette tape is loaded and unloaded and an operative position on the inside of the cabinet through an opening thereof. A lid for closing the opening is slidably mounted on the holder and when the holder is rotated to the inoperative position the lid is moved to a position not to interfere with the loading and unloading of the cassette tape.

12 Claims, 11 Drawing Figures

CASSETTE TAPE LOADING DEVICE

This invention relates to a cassette loading device for loading and unloading a cassette tape into and out of a cassette tape recorder and/or reproducing apparatus.

The cassette loading device of the type referred to above is generally used in a cassette deck or a cassette tape recorder and constructed to load a cassette tape into an opening of the cassette deck or of the cassette tape recorder so as to scan the tape by means of a magnetic head.

Such a loading device comprises a cassette tape holder adapted to be received in said opening and a lid secured to the front surface of the holder for closing the opening when the holder is received therein. When the lid is opened, the cassette holder projects from the front surface of the tape recorder thereby enabling to insert and remove the cassette. On the other hand, when the lid closes the opening of the tape recorder the cassette holder moves the cassette to an operating position. Of course, the lid has a size sufficient to close the opening.

In the prior art cassette loading device described above, it is highly desirable that the cassette can readily be loaded and unloaded into and out of the holder but the prior art device could not satisfy this requirement.

More particularly, when loading a cassette into a holder, the cassette collides against the edge of the lid and in the worst case, a magnetic tape exposed from the cassette might collide against the lid and thus injured. Moreover, since the cassette projects only a little from the holder and located inside of the lid it is difficult to remove the cassette from the holder.

Various improvements have been proposed to solve these problems, but they are not satisfactory in that they are complicated in construction, expensive and that they can be used only for a tape recorder of a specific type.

In one example, a mechanism is provided for pushing out the cassette from the holder for enabling ready removable of the cassette. This mechanism is constructed to push out the cassette from the holder in accordance with the opening movement of the lid. For this reason, this construction can not be used for a so-called cassette upright type deck in which the cassette is inserted into the holder from the front surface (exposed magnetic tape surface). With this construction, there is a danger that the cassette push member comes to engage the exposed portion of the tape. such danger can be obviated only with a complicated construction.

It has also been proposed to increase the angle between the lid and the cassette holder that is the angle of projection of the holder beyond the front surface of the deck for the purpose of making easy the loading and unloading operations. With this construction, however, the relationship between the pivoting point of the cassette holder with the lid and the opening of the deck cabinet is limited and as the angle increases, it is necessary to increase the tension of a spring utilized to urge the holder toward the operating position. This means that a large operating force is required to close the lid thus increasing the operating force and the cost of the spring. In other words, a large force must be applied to close the lid, that is to bring the holder into the operating position which applies an undue force upon the supporting mechanism of the holder and various elements for receiving the holder, thus damaging the same.

Accordingly, it is an object of this invention to provide an improved cassette loading device of a cassette tape recording and/or reproducing device which has a simple construction, does not apply undue force to various component elements, easy to load and unload the cassette and can be incorporated into various types of the recording and reproducing devices.

According to this invention there is provided a cassette tape loading device adapted to be used in recording and or reproducing apparatus including a cabinet having an outer wall provided with an opening, and a recording or reproducing means contained in the cabinet and operatively connected to a cassette tape inserted into the cabinet through the opening, wherein said cassette tape holder comprises means for rotating the holder between an inoperative position on the outside of the cabinet at which the cassette tape is loaded and unloaded into and out of the holder and an operative position on the inside of the cabinet at which the cassette tape is operatively connected to the recording or reproducing means, a lid for closing the opening, means for rotating the lid together with the holder and for sliding the lid with respect to the holder, thereby preventing the lid from interfering with the loading and unloading of the cassette tape into and out of the holder.

In the accompanying drawings:

FIGS. 1 to 4 show a first embodiment of the cassette container of this invention in which.

With reference to FIGS. 1 to 4, a first embodiment of this invention will be described.

Figure 1:
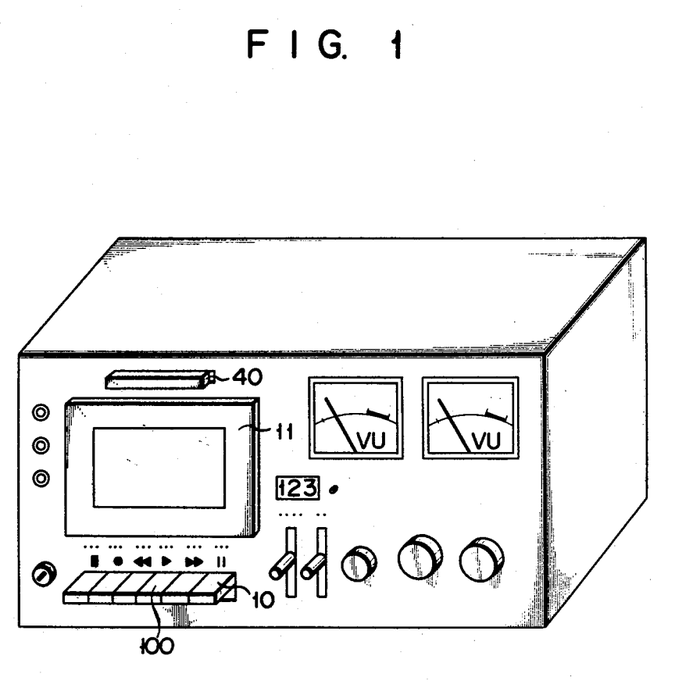
FIG. 1 is a perspective view of a tape deck incorporating the cassette container.
Figure 2:
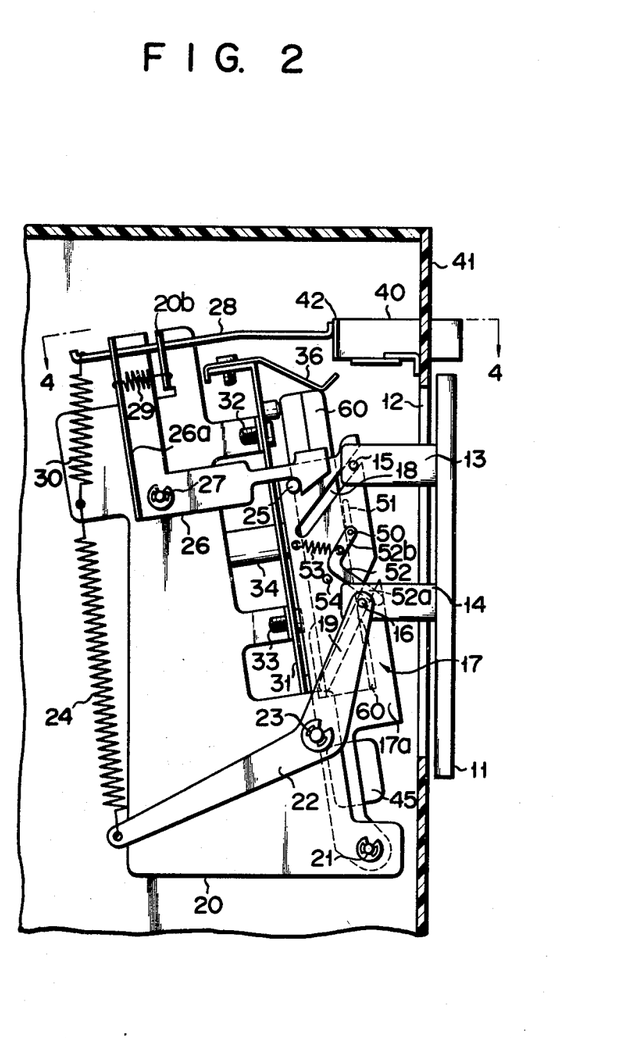
FIG. 2 is a sectional view showing the cassette container with its lid closed.

The cassette deck shown in FIG. 1 has been old except the cassette tape loading device and its operation is controlled by operating levers 10 mounted on the front panel. The lid 11 of the cassette holding device to be described hereunder and an operating button 40 of the cassette holding device are also mounted on the front panel. The lid 11 has a size sufficient to close an opening 12 of the deck cabinet and made of a transparent synthetic resinous material. Two pairs of vertically and horizontally spaced apart legs 13 and 14 (only one of each pair is shown) are secured to the rear surface of the lid 11 as shown in FIG. 2. Pins 15 and 16 adapted to engage the cassette holder to be described later are provided for the legs 13 and 14 near the extended ends thereof.

The holder 17 has a pair of opposed parallel side walls 17a which are spaced apart for receiving a cassette tape, the front surface thereof facing the lid 11 while the rear surface interconnecting the side walls to prevent withdrawal of the cassette tape. Downwardly inclined slots 18 and 19 are formed in the front end face of the side wall 17a of the holder to slidably receive the pins 15 and 16 respectively. The angle of inclination of the slot 18 is larger than that of slot 19. Both side walls 17b, the lid 11 and the supporting plates hold a cassette with its tape exposing side, that is the front surface, faced downward. The lower end of holder 17 is pivotally mounted on a base plate 20 through a pivot pin 21 thus swingable between an operative position shown in FIG. 2 and an inoperative position shown in FIG. 3.

The pins 16 of the legs 14 extend on both sides thereof and loosely connected to one ends of drive levers 22 (only one of them is seen). Each drive lever 22 is L-shaped and its central portion is rotatably supported by the base plate 20 through a shaft 23. The opposite end of the drive lever 22 is connected to one end of a tension spring 24 with the other end anchored by the upper portion of the base plate 20. Although not shown, the other drive lever 22, is not provided with a spring. Thus, the spring 24 biases the drive lever 22 to rotate in the clockwise direction about the shaft 23.

With the construction described above, the lid 11 can move substantially in parallel with the holder 17 by means of slots 18 and 19 provided for the holder 17 but also rotate about shaft 21 together with the holder 17. Thus the lid 11 can move between a first or operative position shown in FIG. 2 in which it closes the opening 12 of the cabinet, and a second or inoperative position shown in FIG. 3 in which it assumes after being moved downwardly relative to the holder 17 and rotated together with the holder.

Figure 4:
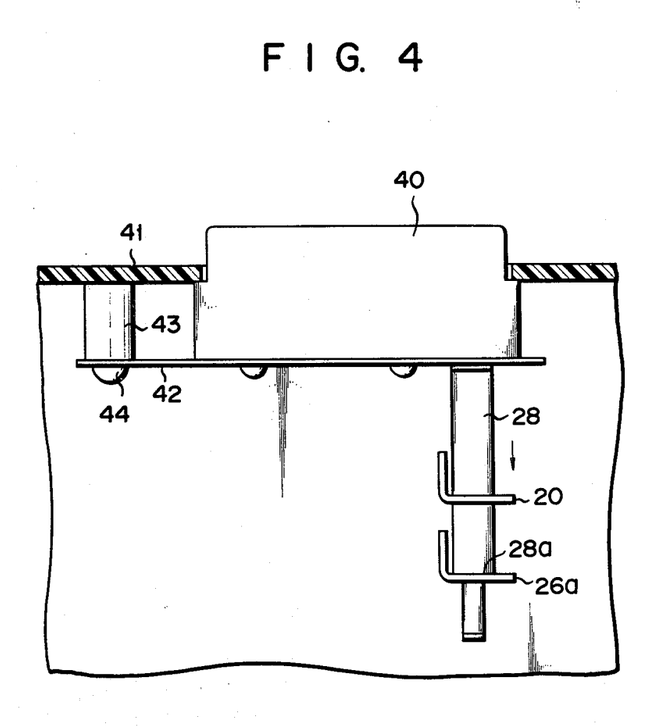
FIG. 4 is a sectional view taken along a line 4—4 in FIG. 2.

A pin 25 is mounted on the upper portion of one of the side walls 17a of the holder, and a hook shaped member 26 is projected forwardly from the rear wall of the cabinet to cooperate with pin 25. The extended end of the hook shaped member 26 is provided with an inclined surface adapted to engage the pin 25 for urging upwardly the hook shaped member, and a hook for arresting the pin 25. The hook shaped member 26 is L-shaped and its central portion is pivotally supported by the base plate 20 through a pin 27. The rear side of the hook shaped member 26 is formed with a upright wall 26a having a slot for receiving a slidable member 28. As best shown in FIG. 4, the slidable member 28 has a shoulder 28a engaging the upright wall 26a of the hook shaped member. Accordingly, when the slidable member 28 is moved rearwardly the hook shaped member 26 will be rotated in the counterclockwise direction as seen in FIG. 2. A tension spring 29 is connected between the rear side of the hook shaped member 26 and an upright wall 20b of the base plate 20 for biasing the member 26 to rotate in the clockwise direction. The slidable member 28 loosely extends through an opening formed in the upright wall 20b. A tension spring 30 is connected between the rear end of the slidable member 28 and the base plate 20 for assuring positive engagement between the slidable member 28 and the hook shaped member 26. The front end of the slidable member 28 is engaged by the rear surface of the operating button 40 which extends forwardly through an opening formed in the front panel 41 of the deck cabinet. As shown in FIG. 4, the operating button 40 is mounted on the front panel 41 by means of a leaf spring 42 having one end secured to a pedestal 43 through a screw 44.

A plate 31 for supporting the cassette tape drive mechanism is secured to the base plate 20 by screws 32 and 33 to oppose the opening 12. The supporting plate 31 is slightly inclined so that the spacing between it and the front panel 41 decreases gradually toward lower. A pair of spindles 34 having bases rotatably mounted on the base plate 20 extend through the central portion of the supporting plate 31 toward the opening 12. A capstan 35 rotated by well known means and a recording-/reproducing head 45 are provided on the lower side of the supporting plate 31 and a cassette holding spring 36 is secured to the upper end of the plate 31. Spindles 34 are adapted to be fitted into the hubs of the cassette and the capstan 35 is adapted to be inserted into an opening formed in the front portion of the cassette to run a magnetic tape together with a pinch roller not shown, in a manner well known in the art. The cassette holding spring 36 comprises a leaf spring inclining downwardly from the upper end of the supporting plate 31 to hold the cassette contained in the holder in the operative position. The magnetic head 45 is movably supported by a supporting arm and interlocked with a reproducing button 100 shown in FIG. 1. Thus, by operating the reproducing button 50 the magnetic head 45 is moved into contact or away from the tape through the supporting arm.

Figure 3:
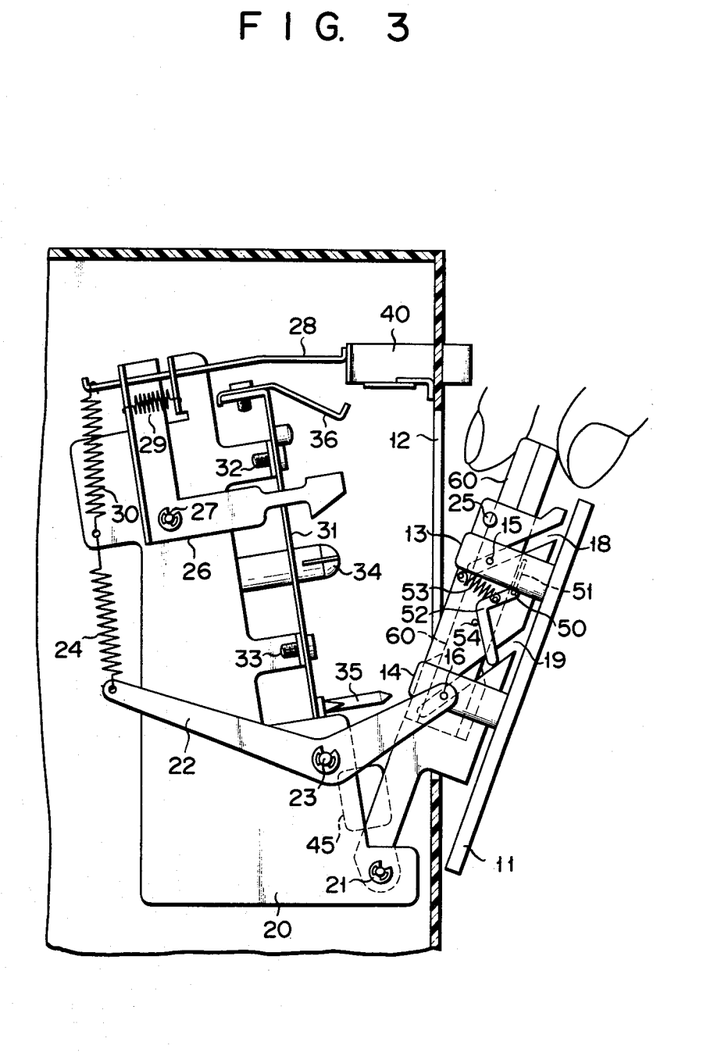
FIG. 3 is a view similar to FIG. 2 but with its lid opened.

Although not always necessary, the cassette tape loading device is provided with a holding mechanism which presses one side of the cassette to limit the movement thereof towards the lid. The holding mechanism comprises an L-shaped rotary arm 52 extending along the outer surface of the side wall 17a of the holder 17. One leg 52a of arm 52 crosses lower guide slot 19 so as to be urged by pin 16 on the upper end of the lever 22 when the holder 17 is rotated from the operative position shown in FIG. 2 to the inoperative position shown in FIG. 3 to rotate arm 52 in the counterclockwise direction about a pin 50 on the other leg 52b. One end of the pin 50 is secured to the leg 52b of arm 52 and the other end extends into the interior of the holder 17 through an opening formed in the side wall 17b to cause the leaf spring 51 to assume a position substantially in parallel with the upper surface of the cassette when the leaf spring is not engaged by pin 50 as shown in FIG. 3. As shown in FIG. 2, a tension spring 53 is connected between the rear end of the side wall 17a of the holder 17 and the leg 52b so as to urge arm 52 to rotate in the clockwise direction. The counterclockwise rotation of the arm 52 is limited by the engagement of the leg 52a and a pin 54 projecting from the side wall 17a. After loading a cassette into the holder 17 in the inoperative position shown in FIG. 3, the holder 17 is rotated to the operative position shown in FIG. 2. Then, the leaf spring 51 is rotated in the counterclockwise direction through the arm 52 and pin 50 thereby holding the cassette in the loaded state by the free end of the leaf spring 51.

The cassette tape loading device constructed as above described operated as follows.

In the condition shown in FIG. 2, the pin 25 is arrested by the hook shaped member 26 so as to maintain the lid at a position for closing the opening 12 of the deck cabinet. Under these conditions, the pin 16 of the leg 14 of the lid 11 is urged to the upper end of the lower guide slot 19 thus holding the lid in the closed position. At this time, due to the difference in the inclination angles of the upper and lower guide slots 18 and 19, the pin 15 engages the side wall of the upper guide slot 18 thereby holding the holder 17 in an inclined stated with respect the lid 11 with the result that the cassette 60 contained in the holder is held in parallel with the supporting plate 31.

At this time, spindle 34 and the capstan 35 for driving the tape of the cassette 60 contained in the holder 17 engage corresponding driving members and cassette 60 is urged toward the magnetic head 45 by the holding spring 36. Accordingly, the cassette 60 is positively held in the operative position to effect reproduction, for example.

Upon completion of the reproduction, the operating button 40 is depressed against the forces of the tension spring 29 and the leaf spring 42 to open the lid 11.

More particularly, as the operating button 40 is depressed, the hook shaped member 26 is rotated in the counterclockwise direction against the force of spring 29 thus releasing pin 25. As a consequence, the holder 17 is rotated in the clockwise direction about the shaft 21 by the tension of spring 24 through the driving lever 22 so as to project outwardly through the opening 12 as shown in FIG. 3. During the rotation of the holder 17, the lid 11 slides down with respect to holder 17 and in substantially parallel therewith so that the rear portion of the cassette 60 contained in the holder projects beyond the upper edge of the lid 11. This is accomplished by the sliding movement of pin 16 connected to the end of the driving lever 22 along the lower guide groove 19 toward its upper end, and by the fact that the leg 14 follows the movement of pin 16.

As above described, since the lid 11 rotates and moves downwardly as the holder rotates it is possible to greatly expose the rear end of the cassette thus permitting the operator to hold it by fingers as shown in FIG. 3.

With the cassette tape loading device described above, the lid positively closes the opening of the cabinet whereas in the inoperative position, the lid moves downwardly in parallel with the cassette thus increasing the effective area of the opening. For this reason, loading and unloading of the cassette into and out of the holder located behind the lid can be made conveniently.

Thus, it is possible to apply the cassette holder of this invention to the cassette upright type tape deck.

Moreover, according to this invention, since it is possible to decrease the opening angle of the lid it is possible to decrease the tension of the spring for opening the lid. Accordingly, it is possible to close the lid with a small force thereby avoiding undue force from being applied upon the supporting mechanism of the lid and other members. In the embodiment described above, the holder moves together with the lid and when the holder is projected from the cabinet the holder is positioned close to the inside of the lid, whereas when the holder is housed in the cabinet, it is inclined and removed away from the lid. In this position, the holder is engageable with the tape driving mechanism in the cabinet thereby assuring positive coupling between the tape driving mechanism and the cassette, especially in a tape deck of the type operated from the front side.

In further embodiments respectively shown in FIGS. 5 to 11, elements corresponding to those shown in FIGS. 1 to 4 are designated by the same reference characters.

Figure 5:
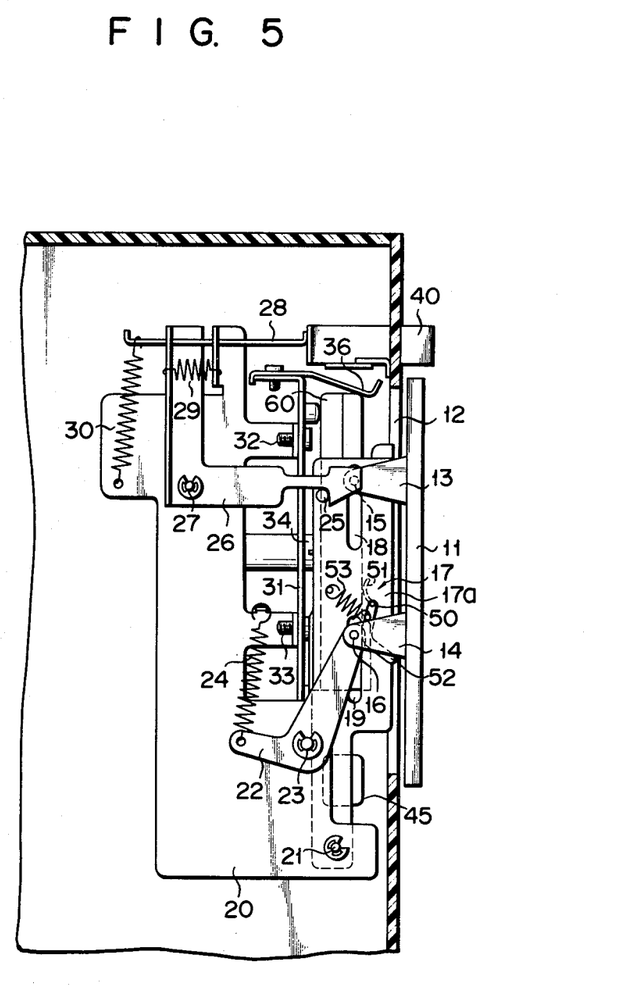
FIGS. 5 and 6 are sectional views showing a second embodiment of this invention and corresponding to FIGS. 2 and 3 respectively.
Figure 6:
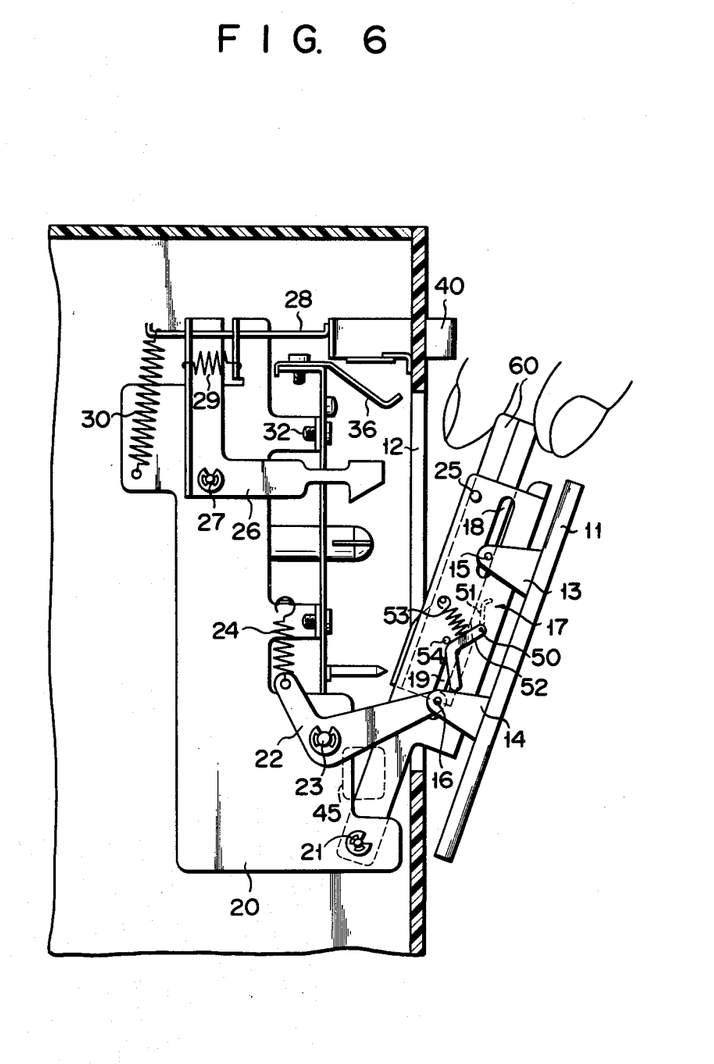

In the second embodiment shown in FIGS. 5 and 6 the inner end of the lower leg 14 is pivotally connected to the upper end of a longer leg of the L-shaped driving lever 22 through pin 16. Spaced apart coextensive guide slots 18 and 19 are formed in the side wall 17a of the holder 17 and the pin 16 is received in the lower slot 19 to be slidable therealong, whereas the pin 15 secured to the inner end of the upper leg 13 is slidably received in the upper guide slot 18. Consequently, when the holder is rotated in the clockwise direction about the shaft 21 from the operative position shown in FIG. 5 to the inoperative position shown in FIG. 6, the pin 16 slides down along the guide slot 19 as the driving lever 22 rotates thereby causing the lid 11 to slide down with respect to the holder 17.

Again, similar cassette holding mechanism is used, wherein the arm 52 is rotated by pin 16 against the force of spring 53 to clamp the surface of the cassette 60 by leaf spring 51.

Figure 7:
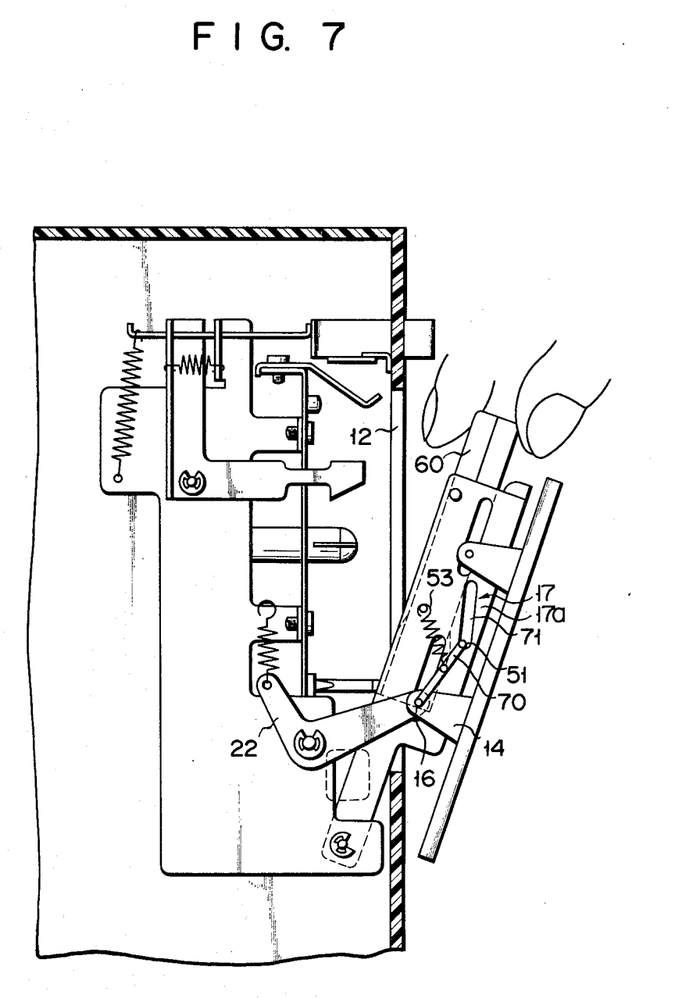
FIGS. 7 and 8 are sectional views showing a third embodiment of this invention and corresponding to FIGS. 2 and 3 respectively.
Figure 8:
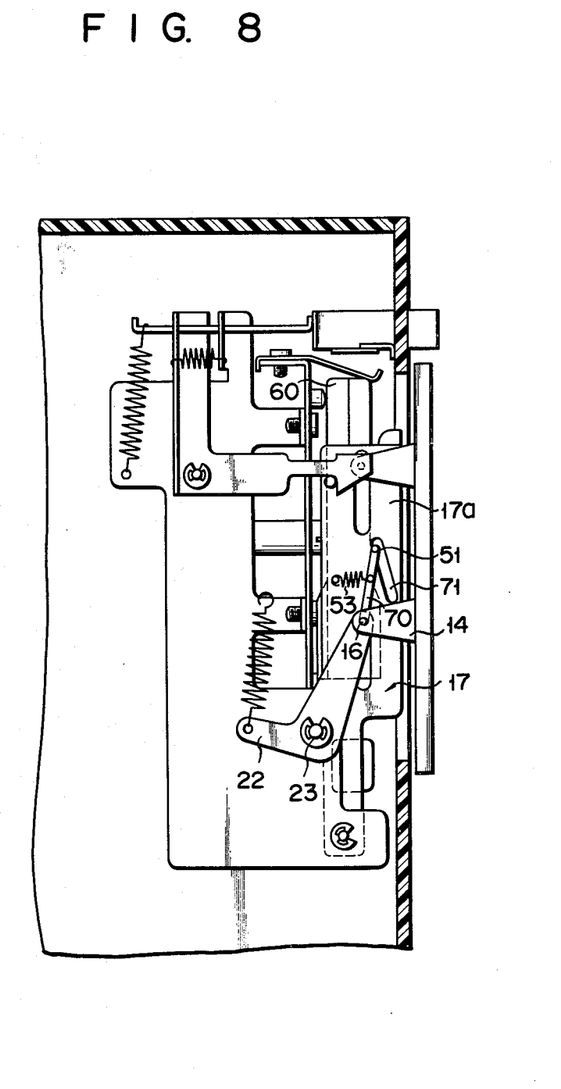

The third embodiment of this invention shown in FIGS. 7 and 8 is similar to the second embodiment except the cassette pressing mechanism. The cassette pressing mechanism of this modification comprises a linear lever 70 having one end connected to the pin 16 which interconnects the driving lever 22 and the lower leg 14. Each side wall 17a of the holder 17 is provided with an inclined guide slot 71 through which extends a press member, for example, a leaf spring 51 mounted on the upper end of the lever 70. The lever 70 is urged rearwardly by a tension spring 53.

When the holder 17 is rotated in the clockwise direction from the operative position shown in FIG. 8 to the inoperative position shown in FIG. 7, the lever 70 moves rearwardly along slot 71 with the result that the spring or a pin 51 is released from the press engagement with the surface of the cassette by the force of spring 53.

Figure 9:
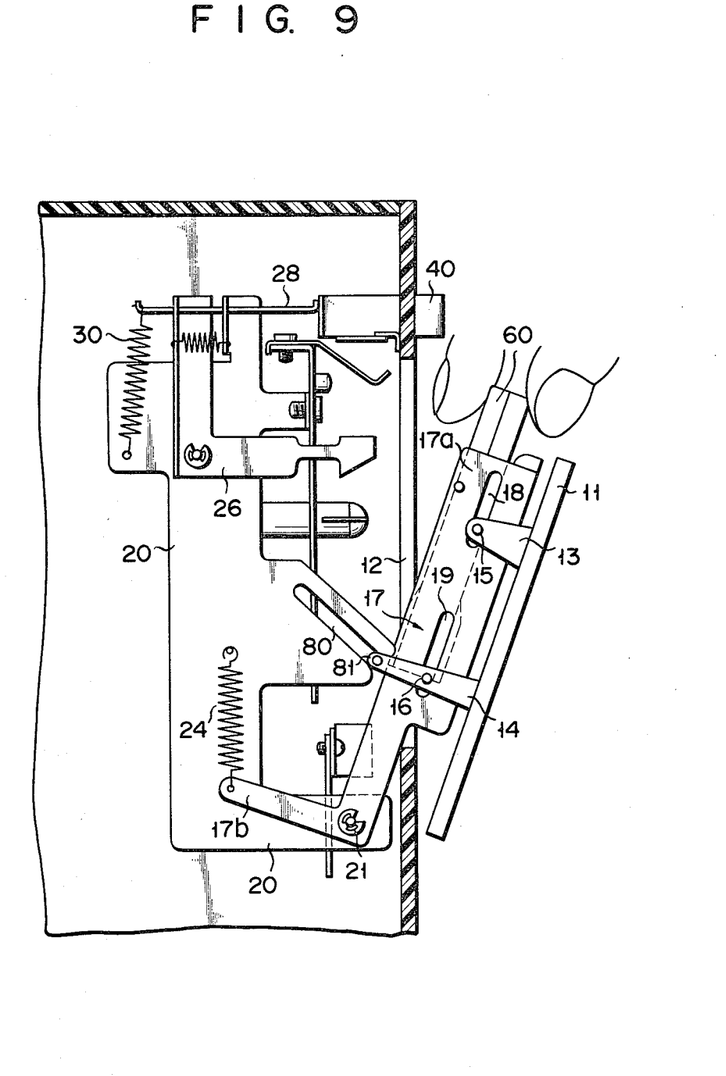
FIGS. 9 to 11 are sectional views respectively showing further embodiments of this invention.

In the fourth embodiment shown in FIG. 9, the mechanism for rotating the holder, the lid and for sliding the lid with respect to the holder is considerably different from those shown in the previous embodiments.

More particularly, the lower end of each side wall 17a of the holder 17 is pivotally mounted on the base plate 20 by the pivot shaft 21 and provided with an integral extension 17b extending rearwardly at right angles. The spring 24 is connected between the rear end of the extention 17b and the base plate 20 for biasing the holder 17 to rotate in the clockwise direction. An inclined guide slot 80 is formed in the front end of the base plate 20 for slidably receiving a pin 81 secured to the inner end of the lower leg 14 of the lid 11. The lower leg 14 is longer than the upper leg 13 and the pin 16 is secured to an intermediate part of the lower leg 14 for engagement with the guide slot 19 formed in the side wall 17a substantially in parallel with the front surface thereof. The pin 15 is mounted on the inner end of the upper leg 13 to be received in the guide slot 18 provided for the side wall 17a in alignment with slot 19. When the holder 17 is rotated in the counterclockwise direction after being loaded with the cassette 60 the lid 11 is moved upwardly with respect to the holder 17 by the guide mechanism comprising the pins 15, 16, 81 and guide slots 18, 19 and 80 so as to close the cabinet opening by the lid 11.

Figure 10:
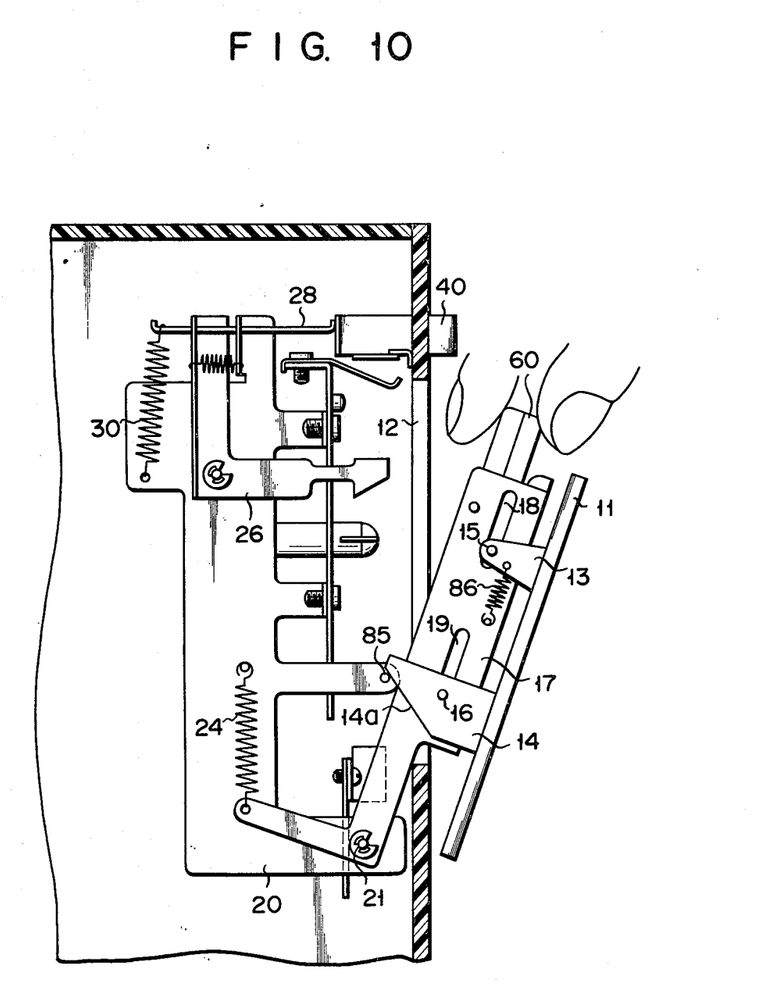

In the fifth embodiment shown in FIG. 10 a guide mechanism different from that shown in FIG. 9 is used. More particularly, the inner end face of the lower leg 14 is bevelled as at 14a to engage a pin 85 supported by the base plate 20, and a spring 86 is connected between the upper leg 13 and the holder 17 for pulling down the lid 11 with respect to the holder 17. Consequently, when the holder 17 is rotated in the counter clockwise direction from the inoperative position shown in the drawing to the operative position, the bevelled surface 14a of the lower leg 14 moves along the pin 85 so that the lid 11 is moved upwardly against the force of spring 86 thus completely closing the cabinet opening 12.

Figure 11:
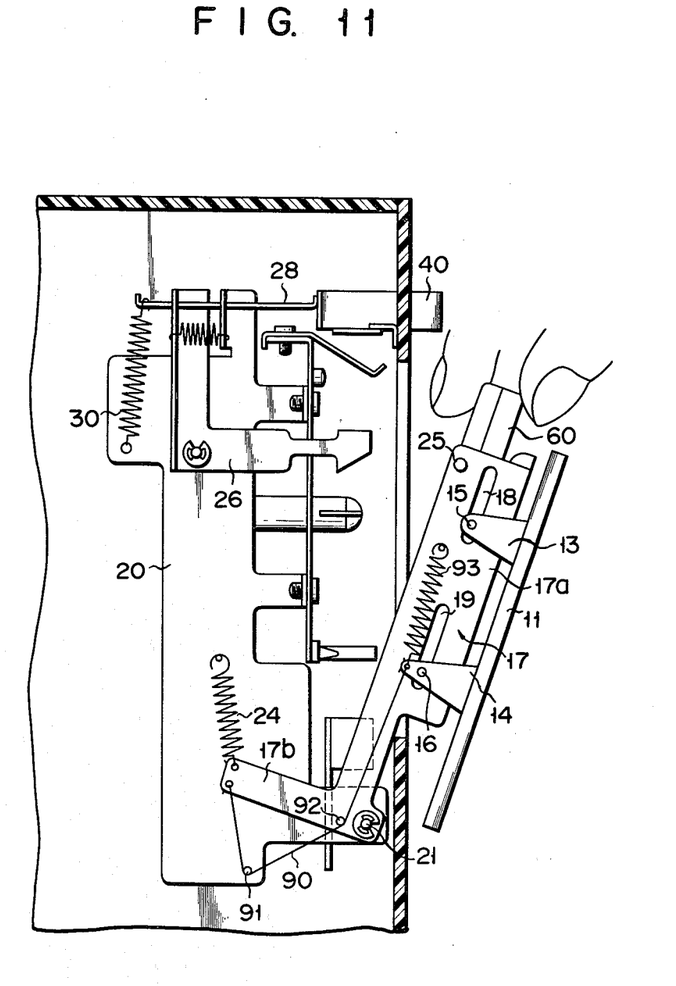

In the six embodiment shown in FIG. 11, as the pins 15 and 16 provided for the legs 13 and 14 of the lid are slidably received by guide slots 18 and 19 respectively formed through the side wall 17a of the holder 17 the lid 11 can slide in the vertical direction with respect to the holder 17. The free end of the extension 17b extended from the lower end of the holder 17 is connected to the base plate 20 through the spring 24 so that the holder 17 is biased to rotate in the clockwise direction. Furthermore, the inner end of the extension 17b is connected to one end of a wire 90 which passes about guide pins 91 and 92 near the lower end of the base plate 20 and the pivot shaft 21, the other end of the wire 90 is connected to the lower leg 14. A tension spring 93 is connected between the upper portion of the side wall 17a of the holder 17 and the lower leg 14 for normally biasing the leg 14 and the lid 11 toward upper. In the inoperative position shown in FIG. 11, the spring 93 is pulled downwardly by the wire 90 via leg 14 so as to pull down the lid 11 with respect to holder 17. When the holder 17 is rotated in the counterclockwise direction to the operative position, the length of the portion of the wire 90 between the outer end of extension 17b and pin 92 via pin 91 decreased with the result that the lid 11 is pulled up by the spring 93 thereby completely closing the cabinet opening 12.

Although in the foregoing embodiments the cassette tape loading device of this invention is described in terms of a deck for recording and or reproducing voice signals it is clear that the cassette container can also be applied to any other device, for example, a video tape recorder.

What is claimed is:

1. A cassette tape loading device adapted to be used in recording and/or reproducing apparatus including a cabinet having an outer wall provided with an opening, and a recording and/or reproducing means contained in said cabinet and operatively connected to a cassette tape inserted in said cabinet through said opening, said cassette tape loading device comprising a holder rotatable between an inoperative position on the outside of said cabinet at which said cassette tape is loaded and unloaded into and out of said holder and an operative position on the inside of said cabinet at which said cassette tape is operatively connected to said recording and/or reproducing means, a lid for closing said opening, means for rotating said lid together with said holder and for sliding said lid with respect to said holder and cabinet, thereby preventing said lid from interfering with the loading and unloading of said cassette tape into and out of said holder.

2. The cassette tape holding device according to claim 1 wherein said holder is provided with an opening at one end for loading and unloading said cassette tape and pivotally mounted on said cabinet at the other end and said lid moves in parallel with said holder when the same is rotated to said inoperative position from said operative position.

3. The cassette tape loading device according to claim 2 wherein said holder comprises a pair of opposed side walls, a first end surface through which a capstan and a spindle for driving said tape exposed to said holder and a second end surface extending in parallel with said lid.

4. The cassette tape loading device according to claim 3 wherein said means for rotating said holder comprises a driving lever which is rotatably mounted on said cabinet, and means for interconnecting said lever, the side wall of said holder and said lid to rotate said holder and slide said lid with respect to said holder when said driving lever is rotated.

5. The cassette tape loading device according to claim 4 wherein said means for rotating said holder comprises spring means for biasing said driving lever to rotate said holder to said inoperative position, latch means for holding said holder in said operative position against the force of said spring means and means for releasing said latch means.

6. The cassette tape loading device according to claim 5 wherein said interlocking means comprises a leg projecting from said lid, and a pin pivotally connecting said driving lever and said leg and moved along a slot formed in one side wall of said holder.

7. The cassette tape loading device according to claim 6 wherein said lid is provided with another leg and said side wall is provided with an inclined slot having different angle with respect to said slot, and said interlocking means further comprises another pin provided for said another leg and slidably received in said inclined slot.

8. The cassette tape loading device according to claim 7 which further comprises cassette tape supporting means operatively connected to said holder rotating means to be pressed against the cassette tape in said holder when it is rotated to said operative position.

9. The cassette tape loading device according to claim 3 wherein said means for rotating said holder and said lid comprises a projection at the other end of said holder, a leg of said lid, a pin extending through said leg and slidably received in a slot provided for the side wall of said holder, spring means for urging said lid to move toward the opening of said holder with respect thereto and means for sliding said lid in the opposite direction against the force of said spring means when said holder is rotated to said inoperative position.

10. The cassette tape loading device according to claim 9 wherein said last mentioned means comprises a wire extending between said by and said projection of the holder about a pin secured to said cabinet and a pin secured to said other end of said holder.

11. The cassette tape loading device according to claim 5 wherein said means for rotating said holder comprises a leg provided for said lid, and pins extending through said leg for slidably moving along a slot provided for the side wall of said holder and a slot provided for said cabinet respectively and wherein said driving lever comprises an extension integrally formed with said holder at said other end.

12. The cassette tape loading device according to claim 5 wherein said means for rotating said holder comprises a leg provided for said lid, an inclined surface at one end of said leg, a first pin extending through said leg and slidably received in a slot provided for the side wall of said holder, a second pin provided for said cabinet for engaging said inclined surface and an extension integrally formed with said holder at the other end thereof.

* * * * *